Feb. 11, 1969 R. M. CHAMBERLIN 3,427,227
FLASH EVAPORATOR WITH DUCT AND BAFFLE MEANS
Filed Jan. 25, 1967
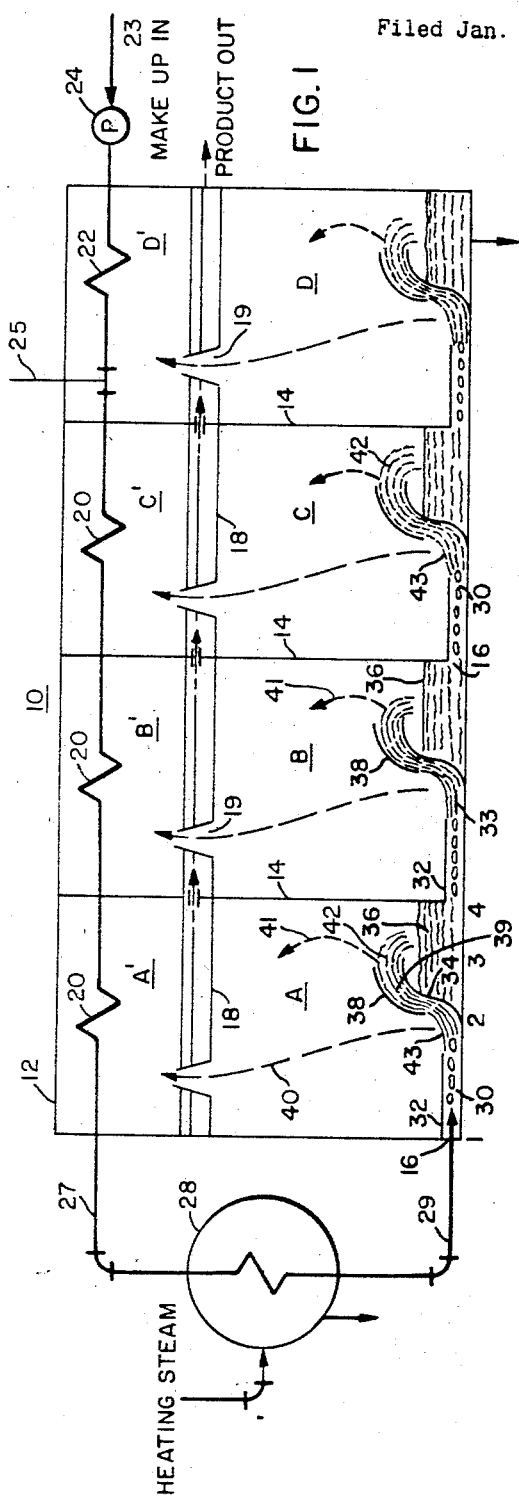
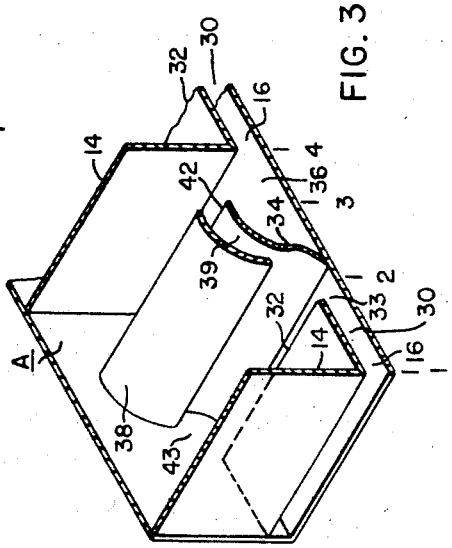
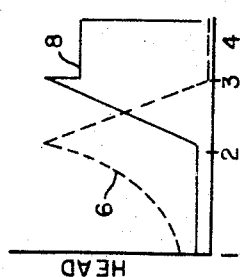
INVENTOR
Richard M. Chamberlin
BY

United States Patent Office 3,427,227
Patented Feb. 11, 1969

3,427,227
FLASH EVAPORATOR WITH DUCT AND BAFFLE MEANS
Richard M. Chamberlin, McKeesport, Pa., assignor to Westinghouse Electric Corporation, Pittsburgh, Pa., a corporation of Pennsylvania
Filed Jan. 25, 1967, Ser. No. 611,665
U.S. Cl. 202—173
Int. Cl. B01d 3/06
4 Claims

ABSTRACT OF THE DISCLOSURE

The invention comprises a narrow cross-sectional area duct extending part way into a flash chamber of a flash evaporator and a diffusing channel spaced downstream from the duct and disposed at a higher level within the chamber than the duct. The lower portion of the diffusing channel comprises an ogee curved shaped baffle structure. The impure liquid to be flashed is directed into the narrow duct which causes vapor bubbles to be created in the liquid flow. The vapor expands which increases the velocity of the flow in the duct. The liquid leaves the duct at the high velocity and is directed against the ogee shaped baffle which causes the vapor to leave the liquid. The liquid is diffused and directed to a higher level in the diffusing channel where it falls to a reservoir to await flow into the next chamber. The above recited structure and operation effectively performs the functions of equilibration, phase separation, injection and stabilization in the flash evaporator.

---

The present invention relates to a unique multi-stage flash evaporator design for effectively utilizing the kinetic and potential energies of a flashing stream of liquid as it passes from stage to stage within the flash evaporator.

Heretofore, numerous devices have been employed in flash evaporators in an effort to realize the vaporizing (flashing) potential of the liquid. Such devices include liquid flow obstacles and surface projections disposed in the path of the liquid flow in order to increase tubulence and disrupt streamline flow of the liquid through the flash chambers. An alternative to the use of these devices has been to extend the lengths of the flash evaporation stages so that the time required for the liquid to flow therethrough is long enough to achieve equilibration. Though much work has been done in these areas, ample room for improvement has remained as will become more apparent hereinafter.

Present flash evaporator designs, employing the above mentioned turbulence producing means or extended stage lengths, sacrifice efficient performance or liquid volume flow in order to achieve (1) satisfactory equilibration of the flashing stream, i.e., bringing the temperature of the total impure liquid content to the saturation temperature value for the stage in which the liquid is found, (2) satisfactory liquid-vapor phase separation to provide a substantially pure product liquid, (3) adequate injection head (liquid height) for forcing the impure liquid through interstage orifices, and (4) stable operation of the flash evaporator without the impure stream rapidly passing through the flash chambers in such a manner as to carry condensible vapors with it. This phenomenon is usually called "blow-by." When blow-by occurs, an attendant increase in pressure occurs in the flash chamber receiving the extra supply of condensible vapors resulting in two adjacent stages having the same or nearly the same pressure. The saturation temperature-pressure differential between stages necessary for a continuous flow of the flashing stream is thereby upset, resulting in unstable operation of the flash evaporator.

The turbulence causing devices have resulted in "carryover" of the impure liquid into the product liquid (i.e., insufficient liquid-vapor phase separation) thereby contaminating the product liquid. When the impure liquid is flashed (vaporized), liquid droplets entrained in the vapor can be carried into the condensing spaces where the droplets then join the condensed vapors (condensate) which form the product liquid.

The elimination of carry-over in present designs has been accomplished by impingement separators, with an associated irreversible vapor pressure drop. The blow-by phenomenon has been remedied by the above-mentioned turbulence causing (mixing) devices or by provision of an increased depth of liquid flow through the flash chamber to assure total submergence of the inlet to the downstream stage.

Thus, the existing conventional means and methods for achieving the four above-named desirable operating factors or functions have been essentially stop-gap measures that have created as many problems as they have attempted to solve. The problem is basically the effective application of available energy to each of the four named factors. The enthalpy (the sum of the internal and flow energies) in a stream can be converted into the form of either a dynamic or static head. The dynamic head is a measure of the kinetic energy of a moving stream and the static head is a measure of the potential energy or pressure of a stable column of liquid.

Briefly, in accordance with the principles of the present invention, a unique liquid flow directing means is employed in the flash chambers of a flash evaporator which effectively applies the most convenient form of the energy to each of the four named factors, namely equilibration, separation, injection and stabilization without the problems outlined above.

This is accomplished by directing the liquid to be flashed through a narrow channel extending horizontally and part way into each flash chamber adjacent to the bottom wall surface thereof. The friction of the entrance portion and the inside surface of the channel on the liquid flow produce a drop in pressure on the liquid which reduces the static pressure of the liquid below its saturation pressure value. To reduce the static pressure on the liquid in a conservative manner the channel could take the form of a nozzle structure. In any case, the drop in pressure results in the nucleation of vapor in the liquid flowing in the channel which causes the liquid to expand to form a high velocity flow of liquid and vapor.

At the exit portion of the channel, the liquid and vapor are centrifugally separated by virtue of a baffle-diffusing structure located a short distance away from the end of the channel with the vapor rising to be condensed and the liquid being diffused to an elevation within the flash chamber. From the elevation of the diffusing structure, the liquid freely falls to create a reservoir of unflashed liquid disposed between the diffusing structure and the wall forming part of the next flash chamber.

Thus, the dynamic head of the liquid stream, developed within the channel, is utilized to rapidly direct the liquid into the diffusing structure so that the vapor phase of the stream is effectively separated from the liquid phase thereby substantially preventing any entrained liquid in the vapor from being carried over into the condensing areas. The liquid further achieves equilibration within the stage by virtue of its being diffused to and allowed to fall from a height within the flash chamber, thus exposing all of the liquid stream to the stage saturation pressure while the liquid at the bottom of the reservoir is subcooled (with respect to the reservoir pressure) and ready for the process to be repeated in the next stage. The diffusing structure thus functions to convert the kinetic energy of the stream to potential energy with the creation of the reservoir of the liquid while simultaneously preventing the blow-by of vapor. The reservoir, in turn, provides the aforementioned interstage injection head (liquid height and pressure) necessary for forcing the liquid through the entrance portion of the channel. The reservoir further functions to regulate the flow of liquid into the next stage, thereby producing stable operation of the flash evaporator. This is accomplished by a varying liquid level characteristic of the reservoir resulting from operational variables such as pressure changes, variations in channel dimensions and the like.

It is therefore an object of the present invention to provide a multistage flash evaporator apparatus in which the phases of a vapor and impure liquid mixture are effectively separated without the use of impingement separators and the consequent drop in the vapor pressure within the stages.

Another object of the invention is to provide a multistage flash evaporator in which a flashing stream of impure liquid is effectively brought to the saturation temperature value for each stage without the carryover of the impure liquid into the condensing space within each stage.

A further object of the invention is to provide a multistage flash evaporator apparatus in which adequate interstage injection pressure is maintained without blow-by of vapor from stage to stage.

Yet another object of the invention is to provide a multistage flash evaporator in which regulated flow and thus stable operation is achieved without substantially slowing the volume of liquid flow through the stages.

Another object of the invention is to provide a novel and inexpensive means for making effective use of the available energy of a stream of liquid in a flash evaporator for accomplishing the above-named objects.

These and other objects and advantages of the invention will be apparent from the following detailed description taken in connection with the accompanying drawing in which:

FIGURE 1 is a schematic view of a multistage flash evaporator incorporating the invention;

FIG. 2 is a graph representing the relationship of the static and dynamic head pressures of a flashing stream of liquid within a flash chamber as employed in the flash evaporator of FIG. 1; and FIG. 3 is a partial perspective view of a flash chamber constructed in accordance with the principles of the present invention.

Referring to the drawing in detail, there is shown a multistage flash evaporator, generally designated 10, comprising a plurality of staged flash evaporation chambers (for example four as illustrated) A, B, C, and D wherein chamber A is the first and highest pressure stage, B is the next highest then C and finally D is the last and lowest pressure stage. The flash chambers are formed by an external housing structure generally designated 12 and vertical internal partitions denoted in each case by the numeral 14. The chambers A, B, C and D are disposed in liquid communication by way of interconnecting inlets 16 provided in the lower portion of partitions 14, each inlet 16 forming an entrance portion of a duct or channel structure to be more fully described hereinafter.

The housing structure 12 further defines an equal plurality of vapor condensing spaces A' through D' for receiving condensible vapors formed in the flash chambers A through D, respectively. The condensing spaces, as shown, are disposed in the uppermost portion of the housing structure and are further defined by generally horizontally extending trays 18. The trays are provided with vertically extending flow passages 19 for permitting the vapors formed in the flash chambers to flow upwardly into the condensing spaces A' to D'.

The condensing spaces A' to D' are provided with suitable surface heat exchanging or condensing tube structures generally designated 20 in the spaces A' to C', and 22 in the space D'. For purposes of illustration, the tube structures are only diagrammatically shown.

The liquid to be flashed is directed from any suitable source, for example from a river or sea if the liquid is impure water, to the flash evaporator apparatus 10, as indicated by line 23. The liquid may be pressurized by a suitable pump 24 and directed through tube structure 22 in the condensing space D'. The vapors rising from the flash chamber D condense while transferring heat to the impure liquid directed through the tube structure. A portion of the thus heated liquid is then rejected from the system and returned to its source in a well known manner as indicated by line 25. The remaining portion of the heated impure liquid is directed to the condensing tube structures 20 in condensing spaces C' to A' for the condensing of the rising vapors formed in the flash chambers C to A.

As well known in the art, the impure liquid is progressively heated before evaporation by being directed successively through the tube structures 20 in spaces C' to A'. The liquid is heated further by a suitable top heater 28 after leaving the tubes, as indicated by line 27. The finally heated impure liquid is then directed to the first and highest pressure stage chamber A, as indicated by line 29, in which a portion of the liquid is flashed into vapor in accordance with the principles of the invention in a manner to be more fully explained.

In FIGS. 1 and 3 are shown the novel means associated with each flash chamber with which the four functions of equilibration, separation, injection and stabilization are effectively performed in a flash evaporator. Extending horizontally within the flash chamber A along the bottom surface thereof is a narrow duct or channel 30 which may be formed by a horizontally extending wall portion 32 cooperating with the bottom wall surface of the chamber and extending between the side walls thereof, as best seen in FIG. 3. The length of the duct is such that a sufficient dwell time is provided for the flow of impure liquid therethrough in order to create a sufficient supply of vapor within the liquid in the duct in a manner to be more fully explained hereinafter. The duct 30 is provided with an outlet portion 33 within the chamber.

Disposed between the outlet portion 33 of the duct 30 and the internal partition 14 is a baffle structure 34 extending laterally between the side walls of the flash chamber, as best seen in FIG. 3, and sealed thereto in such a manner that a receptacle is formed for retaining a supply of reservoir of unflashed liquid 36 as best seen in FIG. 1.

The baffle structure 34 has an ogee curvature, i.e. it takes generally the form of two arcs joined together to form a continuous surface having a reversed direction of curvature, and is located a sufficient distance from the end of the duct 30 to allow the vapor created in the duct to escape and rise from the liquid after the liquid is directed against the baffle structure as explained hereinafter.

Immediately above the upper portion of the baffle 34 is disposed a second baffle member 38 generally conforming to the curvature of the upper portion of the first baffle but forming a diffusing channel 39 for receiving the unflashed liquid before it drops into the reservoir 36 through an exit portion 42. Though the baffle member is preferably arc shaped, it may be planar shaped so long as it forms a channel of increasing cross-section for the purpose of diffusing the liquid stream. The baffle member 38 is located downstream from the outlet portion 33 of the duct 30 to provide an opening 43 which allows the vapor in the liquid to escape in a manner presently to be explained.

In operation, the preheated impure liquid is directed via line 29 to the entrance portion 16 of the duct 30. The limited cross-sectional area of the duct and its entrance portion provides a friction on the liquid which reduces the static pressure on the liquid to its saturation pressure value which then causes the nucleation of vapor bubbles within the liquid. This in turn causes the volume of the liquid to expand as the mixture (vapor and liquid) flows through the duct 30 which thereby substantially increases its velocity of flow, i.e., its dynamic energy in the duct. The mixture leaves the duct at a high velocity adjacent to the opening 43.

Adjacent the opening 43, the two phases (vapor and liquid) in the high velocity mixture are centrifugally separated by the force of the stream moving against the curved lower surface of the baffle 34. The liquid (with its greater mass and inertia) moves up through the channel 39 between the baffles where it is diffused and directed to a higher elevation within the chamber. A major portion of the vapor content leaves the mixture via the opening 43 before the stream is forced into the diffusing channel 39, the major vapor flow being indicated by dashed arrows 40.

From the higher level of the diffusing channel 39, the liquid freely falls to the level of the reservoir 36. The diffusing structure thus functions to convert the kinetic energy of the high velocity liquid to potential energy in the liquid contained in the reservoir.

Further, the elevated flow and fall of the stream within the flash chamber provides ample opportunity for the liquid content to attain the saturation temperature value (equilibration) for the stage in which it is flowing, in this instance flash chamber A. In so doing, any vapor which is potentially available from the liquid stream is given a further opportunity to leave the stream, as indicated by dashed line 41. Thus, the vapor content (40 and 41) flows into the condensing space A' while the impure liquid is prevented from entering the space by the baffle 38. Equilibration (the first of the four functions) is thus accomplished with the novel structure shown in FIGS. 1 and 3.

With the centrifugal separation of the vapor via the opening 43, and the further separation of any remaining vapor in the impure liquid stream by virtue of the equilibration function, the second function, namely, vapor-liquid separation is effectively performed thereby substantially eliminating the problem of contaminating the pure product liquid. Further, the effective separation of the vapor from the liquid substantially reduces the vapor content in the liquid that can pass from stage to stage.

The liquid in the reservoir 36 is then at the saturation temperature value of the stage A. The liquid at the bottom of the reservoir, however, is subcooled with respect to the pressure at the surface and is ready for the process to be repeated in the next stage and in the succeeding stages thereafter wherein similar structure may be employed, as illustrated.

With the creation of the reservoir 36 the blow-by problem is essentially eliminated, and adequate injection head is provided which assists in forcing the liquid into the next stage through the inlet 16, thereby performing the third function for effective and efficient operation of the flash evaporator 10.

The reservoir, however, performs also the fourth function (as outlined earlier), namely, stabilization. This is accomplished by a variable liquid level function that is characteristic of the reservoirs 36 in each of the stages which in turn regulate the flow of liquid between stages. If, for example, a pressure change occurs within a chamber or chambers, the liquid level (static head) of the reservoirs adjust accordingly which allows the pressure differentials between stages to readjust. This, in turn, provides an even, stable flow of the impure liquid stream through the flash evaporator. Other operational variables are similarly accommodated by the variable level feature of the reservoirs 36.

The process may be graphically illustrated by the energy curves of FIG. 2 in which the kinetic energy of the liquid stream is represented by dash line curve 6, and the potential energy of the liquid is represented by solid line curve 8. The curves 6 and 8 describe the operation within the first flash chamber A of the flash evaporator 10, but is representative of the operation of the other chambers. Thus, the abscissa of the graph is labeled with numbers 1 through 4 which correspond to identically numbered locations or portions designated along the bottom wall portion of the first chamber A in FIG. 1. The four locations generally represent, respectively, the entrance portion 16 of the duct 30, the vapor escape opening 43 provided between the end portion 33 of the duct and the baffle 38, the exit portion 42 of the diffusing channel 39, and the reservoir 36.

Thus, at location 1, the curve 6 begins and rises rapidly in a curved manner to location 2 from which it falls in a rectilinear manner to a minimum level at location 3. The minimum level of the curve 6 continues through location 4 representing the minimum kinetic energy of the liquid in the reservoir 36.

While the curve 6 immediately begins to rise at location 1, the curve 8 (potential energy) maintains a low steady state level to the location 2 from which it rises rapidly in a rectilinear manner to the location 3. At location 3, it immediately drops to a somewhat lower level representative of the reservoir 36, which level is maintained until the liquid in the reservoir enters the next flash chamber.

It should now be apparent that a new and improved flash evaporator flow design has been disclosed which effectively performs the functions of equilibration, separation, injection and stabilization by the effective employment of the dynamic and static heads of a flashing stream. This is accomplished by directing the liquid to be flashed into a restricted cross-sectional area duct horizontally extending into the flash chamber so that vapor is formed therein, and then separating the vapor from the stream by directing and diffusing the liquid therein to a higher elevation in the flash chamber before it is allowed to fall to a reservoir provided by a portion of the means directing and diffusing the liquid.

Though the invention has been described with a certain degree of particularity it is to be understood that modifications thereof are possible within the scope and spirit of the invention.

What is claimed is:

1. A flash evaporator apparatus for producing a substantially pure product liquid from an impure liquid comprising means defining a plurality of chambers for flash evaporating a portion of the impure liquid to form condensible vapor, means defining a duct of restricted cross-sectional area extending horizontally and part way into at least one of the chambers so that the duct has an exit portion inside the chamber, means for directing the impure liquid to said duct, said duct causing the expansion of said liquid to create a high velocity flow thereof in said duct and from the exit portion of said duct, a first baffle structure disposed adjacent the exit portion, and in a manner to allow the impure liquid to maintain its flow through the chamber, said baffle extending upwardly and forwardly from the bottom of the chamber and across the width of the chamber to divide the lower portion thereof into first and second liquid flow sections in the direction of liquid flow, and a second baffle means disposed above the first baffle structure to form a channel therewith for diffusing and directing the impure liqiud therethrough to an elevation in the chamber considerably above that of the restricted area duct, and in the direction towards the next succeeding chamber so that the impure liquid falls into and collects in the second flow section to form a reservoir of liquid having a height considerably above that of said duct.

2. The apparatus of claim 1 in which the first baffle structure has an ogee curve configuration,
said baffle having a lower end located on the bottom of the flash chamber and an upper end disposed in the chamber at a height considerably above the level of the restricted area duct.

3. The apparatus of claim 1 in which the second baffle is an arc-shaped structure.

4. In a flash evaporator apparatus having a plurality of chambers for flash evaporating an impure liquid to form condensible vapor,
a structure for achieving equilibration, separation, injection and stabilization effects within the flash evaporator apparatus by effective application of available energy in the evaporator to each of said functions comprising
means defining a restricted cross-sectional area duct extending horizontally and part way into at least one of the chambers so that the duct has an exit portion inside the chamber,
a first baffle structure disposed adjacent the exit portion, and extending upwardly and forwardly from the bottom of the chamber and across the width of the chamber to divide the lower portion thereof into first and second liquid flow sections, and
a second baffle means spaced from the exit portion of the duct and disposed above the first baffle structure to form a channel therewith for directing and diffusing the impure liquid therethrough to an elevation a considerable distance above that of the restricted area duct and in the direction of the next succeeding chamber so that the liquid falls into and collects in the second flow section to a height considerably above that of said duct.

References Cited

UNITED STATES PATENTS

| | | | |
|---|---|---|---|
| 3,003,931 | 10/1961 | Worthen et al. | 203—88 |
| 3,174,914 | 3/1965 | Worthen et al. | 203—88 |
| 3,180,805 | 4/1965 | Chirico | 202—173 |
| 3,203,464 | 8/1965 | Kingma | 202—173 |
| 3,219,553 | 11/1965 | Hughes | 202—173 |
| 3,228,859 | 1/1966 | Frankel et al. | 202—173 |

FOREIGN PATENTS 610,314  12/1960  Canada.

WILBUR L. BASCOMB, JR., *Primary Examiner.*

U.S. Cl. X.R.

202—180, 197; 203—11, 80, 88